United States Patent [19]
Freitas et al.

[11] Patent Number: 5,617,536
[45] Date of Patent: Apr. 1, 1997

[54] METHOD AND APPARATUS FOR SERVO CONTROL WITH ERROR DETECTION OF GRAY (PENNINGTON) CODE USED FOR SERVO TRACK ID

[75] Inventors: David A. Freitas, Morgan Hill; Louis J. Serrano; Mantle Man-Hon Yu, both of San Jose, all of Calif.

[73] Assignee: International Business Machines Corporation, Armonk, N.Y.

[21] Appl. No.: 396,810

[22] Filed: Mar. 2, 1995

[51] Int. Cl.⁶ .................................................. G06F 11/00
[52] U.S. Cl. ........................................................ 395/185.01
[58] Field of Search .............................. 395/185.01, 404; 360/48, 49, 78.14

[56] References Cited

U.S. PATENT DOCUMENTS

| | | | |
|---|---|---|---|
| 4,914,644 | 4/1990 | Chen et al. | 369/43 |
| 5,274,510 | 12/1993 | Sugita et al. | 360/49 |

FOREIGN PATENT DOCUMENTS

| | | | |
|---|---|---|---|
| 0262690 | 5/1982 | European Pat. Off. | G11B 5/55 |
| 0094314 | 5/1982 | European Pat. Off. | G11B 5/58 |
| 0459265A2 | 5/1991 | European Pat. Off. | G11B 5/596 |
| 0526229 | 7/1992 | European Pat. Off. | G11B 5/596 |
| 9607178 | 8/1994 | WIPO | G11B 5/596 |

OTHER PUBLICATIONS

D.H. Pennington, "Dicell Gray Coding of Disk File Track Addresses", *IBM Technical Disclosure Bulletin*, vol. 25, No. 2, Jul. 1982, pp. 776–777.

M. Kisaka et al., "Improved Gray Code Pattern on a Hard Disk", *IBM Technical Disclosure Bulletin*, vol. 35, No. 4B, Sep. 1992, pp. 373–374.

Y. Kigami, et al., "Sector Address in Gray Code Area", *IBM Technical Disclosure Bulletin*, vol. 37, No. 02B, Feb. 1994, p. 565.

*Primary Examiner*—Robert W. Beausoliel, Jr.
*Assistant Examiner*—Stephen C. Elmore
*Attorney, Agent, or Firm*—Baker, Maxham, Jester & Meador

[57] ABSTRACT

Logic for detecting the reliability of an address in Pennington code (PCODE). The address is parsed into two separate halves. The first half corresponds to the front portion of the PCODE address and the second half corresponds to the back portion of the same. The two halves are compared to determine the reliability of the address. If the address is not reliable, a head position estimation is used to position the head over the described track. If the address is reliable, the PCODE is combined with a position error signal to position the head.

32 Claims, 10 Drawing Sheets

| NUMBER | BINARY | GRAY CODE | PENNINGTON | TRANSITION SIGNAL F\|B\|F\|B\|F\|B\|F\|B |
|---|---|---|---|---|
| 0 | 0000 | 0000 | 01 01 01 01 | |
| 1 | 0001 | 0001 | 01 01 01 10 | |
| 2 | 0010 | 0011 | 01 01 10 10 | |
| 3 | 0011 | 0010 | 01 01 10 01 | |
| 4 | 0100 | 0110 | 01 10 10 01 | |
| 5 | 0101 | 0111 | 01 10 10 10 | |
| 6 | 0110 | 0101 | 01 10 01 10 | |
| 7 | 0111 | 0100 | 01 10 01 01 | |
| 8 | 1000 | 1100 | 10 10 01 01 | |
| 9 | 1001 | 1101 | 10 10 01 10 | |
| 10 | 1010 | 1111 | 10 10 10 10 | |
| 11 | 1011 | 1110 | 10 10 10 01 | |
| 12 | 1100 | 1010 | 10 01 10 01 | |
| 13 | 1101 | 1011 | 10 01 10 10 | |
| 14 | 1110 | 1001 | 10 01 01 10 | |
| 15 | 1111 | 1000 | 10 01 01 01 | |

*FIG. 4*

| NUMBER | REG.1 | SIGNAL 1 | REG.2 | -(REG.2) | SIGNAL [-(REG.2)] |
|---|---|---|---|---|---|
| 0 | 0000 | | 1111 | 0000 | |
| 1 | 0001 | | 1110 | 0001 | |
| 2 | 0011 | | 1100 | 0011 | |
| 3 | 0010 | | 1101 | 0010 | |
| 4 | 0110 | | 1001 | 0110 | |
| 5 | 0111 | | 1000 | 0111 | |
| 6 | 0101 | | 1010 | 0101 | |
| 7 | 0100 | | 1011 | 0100 | |
| 8 | 1100 | | 0011 | 1100 | |
| 9 | 1101 | | 0010 | 1101 | |
| 10 | 1111 | | 0000 | 1111 | |
| 11 | 1110 | | 0001 | 1110 | |
| 12 | 1010 | | 0101 | 1010 | |
| 13 | 1011 | | 0100 | 1011 | |
| 14 | 1001 | | 0110 | 1001 | |
| 15 | 1000 | | 0111 | 1000 | |

METHOD AND APPARATUS FOR SERVO CONTROL WITH ERROR DETECTION OF GRAY (PENNINGTON) CODE USED FOR SERVO TRACK ID

BACKGROUND OF THE INVENTION

1. Field of the Invention

This invention relates generally to data storage device servo control systems and, more particularly, to detecting errors resulting from the demodulation of servo track identification information that is used to determine the location of a read/write head relative to disk tracks.

2. Description of the Related Art

In conventional computer data storage systems having a rotating storage medium, such as a magnetic or magneto-optical disk, data is stored in a series of concentric or spiral tracks across the surface of the disk. The data comprises a series of variations in disk surface magnetic orientation recorded laterally in the tracks. A magnetic read/write head suspended over the disk surface transduces the variations in magnetic orientation and produces a readback signal. The variations in magnetic orientation, generally comprising reversals of magnetic flux, represent binary digits of ones and zeroes that in turn represent data. The magnetic read/write head detects the variations in magnetic orientation and generates the readback signal as the disk rotates relative to the read/write head at thousands of revolutions per minute.

Reading and recording data in a desired one of the tracks requires knowledge of the track over which the read/write head is positioned and requires precise centering of the read/write head over the track as the disk rotates. Conventionally, the read/write head is mounted on a disk arm that is moved by a servo. A disk drive servo control system controls movement of the arm radially across the disk to move the read/write head from track to track in a seek operation and, once over a selected track, to maintain the head in a path centered over the track in a track-following operation.

A servo control system moves the read/write head to a desired track and maintains the head centered over a track by reading servo information from the disk surface. The servo information comprises a pattern of high-frequency magnetic flux transitions, generally flux reversals, that are pre-recorded in the tracks at the time of disk manufacture. A servo read head, which can be either the same head used for reading the binary data or can be a dedicated servo head, transduces the servo information and produces a servo signal.

There are a variety of methods for providing servo information to a disk servo control system. In a method referred to as the dedicated servo method, the entire surface of one disk is provided with servo information. A servo magnetic head is positioned over the dedicated servo disk surface in a fixed relationship relative to one or more data read/write heads positioned over other data disk surfaces. The position of the servo head is used to indicate the position of the data read/write heads. The dedicated servo method is most often used with multiple disk systems, because a dedicated servo system for a single disk application would use one-half of the available disk surface area for servo information and therefore would not be especially efficient.

Another method of providing servo information is known as the sector servo method. In the sector servo method each disk surface includes servo information and binary data within a single track. The tracks on a sector servo disk surface are divided into radial sectors having a short servo information field followed by a data field. The servo information field includes a sector or address marker, which indicates to the read/write head that servo information immediately follows in the track, a track identification number, and a high-frequency servo burst pattern. The sector servo method is more efficient than the dedicated servo method for low-profile disk drives with fewer disks in the configuration, because a single read/write head can be used to obtain the servo information and to read and record data from the disk and also because less of the total disk surface area is used for servo information. The remaining description assumes a sector servo system, but it will be clear without further explanation to those skilled in the art how the description can be applied to dedicated servo systems.

The portion of the servo information comprising the track identification number is typically recorded as digital information and the portion comprising the servo burst pattern is typically recorded as analog information. That is, the magnetic flux transitions comprising the track number define a binary value, while the servo burst pattern produces an analog position error signal (PES), the magnitude of which indicates the position of the read/write head relative to the track centerline. The servo control system includes demodulation circuitry to distinguish between the two portions of the servo signal.

Because the PES indicates position of the servo head within a single track, the PES provides a fine position control for the disk arm servo. To provide such fine position control, the PES servo burst pattern typically repeats every few tracks, which limits its effectiveness in determining absolute track location on the disk. In contrast, the digital encodement of the track identification number indicates servo head position within an absolute track location of plus or minus one track and therefore provides coarse disk arm position control.

The coarse disk arm position information is useful during a seek operation, when the servo head is travelling too fast to demodulate the PES pattern or when the servo head position is otherwise known only to within the repetition of the PES pattern cycle and not in absolute track terms. The digital encodement of the track identification number also permits additional information to be encoded as well, such as the head number and sector number. Such information is collectively referred to as the cylinder address or track ID information.

Sector servo disk drives typically encode the track identification number using what is known as a gray code. A gray code provides a sequence of binary numbers in which only one digit changes state from one code value to the next. For example, in a conventional 3-bit binary representation, the binary code representation from the number three to the number four changes from "011" to "100", comprising a state change in each of the three digits. That is, the first most significant bits (digits decrease in significance from the left to the right) changes state from zero to one while the second bit and third or least significant bit change state from one to zero. A gray code maps each binary number to a binary representation such that only one bit changes state for each number in the sequence.

An example of a typical 3-bit gray code is provided in the following table:

TABLE 1

Binary-to-gray-code mapping.

| Binary number | Gray code equivalent |
|---|---|
| 000 | 000 |
| 001 | 001 |
| 010 | 011 |
| 011 | 010 |
| 100 | 110 |
| 101 | 111 |
| 110 | 101 |
| 111 | 100 |

Those skilled in the art should be able to complete the code table, using the rule that the single least significant bit is changed with each new number to obtain the next gray code equivalent. From the table, it should be clear that only one digit changes value at a time. Thus, the change from the number three to the number four involves a change only to the most significant bit "010" to "110").

Gray code numbering schemes are advantageous in servo track identification encodement because the track identification number representation for adjacent tracks will be guaranteed to differ by only one bit. Thus, if the servo control system attempts to decode the track identification number while moving in a seek operation between two tracks, the number decoded by the system will be off the true number by at most one track.

Typically, a gray code for track identification encodement is implemented with each code bit requiring two flux transitions. Using two flux transitions to encode a bit preserves the magnetization sequence of the signals from the respective binary digits between tracks. A commonly used scheme, known as "Pennington code", encodes a zero as "01" and a one as "10", achieving the same preservation of magnetization. The Pennington code will necessarily contain the gray code, plus bits added for the purposes of preserving the magnetization. Thus, a typical prior art technique for decoding a track ID is to simply extract the half of the Pennington code that contains the gray code that identifies the track, and positioning the head accordingly. The other half of the code is simply ignored by prior art systems.

The prior art has used a technique of bit-by-bit comparison method when a single defect is noted in a Pennington code address. Unfortunately, the prior art has not provided a technique for easily identifying errors that may exist in the Pennington code. Yet errors occur quite frequently. A common error that occurs involves missing a bit or detecting an extra bit. Such a condition leads to faulty or error-ridden Pennington code. An error in the interpretation of even a simple 4-bit gray code could result in an identifying track number that is off by up to 8 tracks. This would be the case if the gray code "0" in the most significant bit is interpreted as a "1" (e.g., interpreting "0001" to be "1001"). The problems created by such errors are even worse if the Pennington code contains a large number of bits. For example, if the binary representation of a cylinder address is as many as 13 or 14 bits, an error in interpreting its most significant bit would result in an address being used for positioning the head that is thousands of tracks away from the real track location. Clearly, there is a long-felt need for a method, system, or apparatus that can easily ensure the reliability of an address encoded according to a Pennington Code scheme.

SUMMARY OF THE INVENTION

An objective of this invention is to provide a simple way to determine if a Pennington coded address is reliable.

A further objective of this invention is to provide a way to position a head in accordance with the determination of whether or not the Pennington coded address is reliable.

In accordance with the objectives of this invention, a method and apparatus for detecting errors in an address data field encoded in Pennington code is provided for use with disk servo track identification information. This invention provides automatic means for determining whether to use the address or rely on calculated estimates to position the read/write head relative to the tracks.

The address data field is parsed into its front and back half, each of which is placed in respective storage registers. The contents of the front half register are compared to the inverted contents of the back half register. Based on the comparison, the validity of the address is determined and a control output signal is created to position the head.

Other features and advantages of the present invention should be apparent from the following description of the preferred embodiment, which illustrates, by way of example, the principles of the invention.

DESCRIPTION OF THE PREFERRED EMBODIMENTS

Now with reference to the drawings, in which the same or similar numbers shown in various Figures represent the same or similar elements throughout.

Architecture of Servo Disk System

Figure 1:
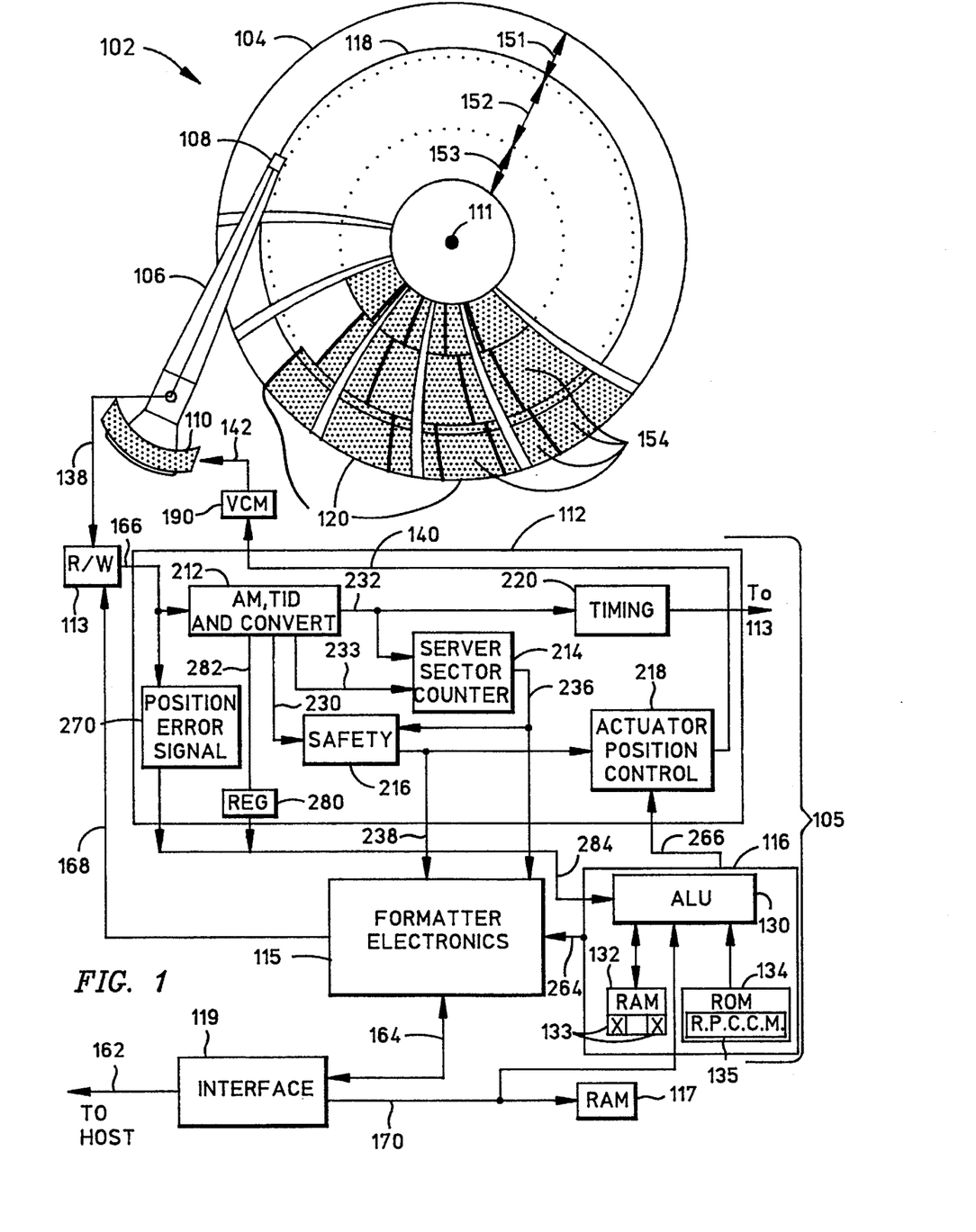
FIG. 1 is a schematic representation and block diagram of a disk drive and servo control system constructed in accordance with the present invention.

FIG. 1 illustrates a sector servo disk drive 102 having a servo control system 105 constructed in accordance with the present invention. The servo control system includes servo electronics 112 and servo control processor 116. The disk drive includes a disk 104 that is rotated in a clock-wise direction and a disk arm 106 that is moved radially across the disk as user data is read and recorded from the disk by a read/write head 108. The choice of rotational direction is, of course, not critical to the invention. The head 108 also is used to read servo information from the disk. In a preferred embodiment the disk is formatted using a well-known fixed-block architecture (FBA) utilizing sector servo recording. The drive further comprises a voice coil module (VCM) 190 in communication with voice coil magnet 110 for controlling the movement of the arm 106, and accordingly the positioning of the head over the disk surface. The VCM module communicates with the voice coil magnet 110 through communication path 142. Read/write (R/W) electronics 113 in communication with the servo electronics 212 provides a means for, among other things, reading servo information. The read/write circuitry receives the data from the head through path 138 and passes it along path 166 to the servo electronics.

Preferred Embodiment of a Disk Medium Usable with the Servo Disk System

Disk 104 comprises center of rotation 111 and is divided for head positioning and data storing purposes into a set of radially spaced tracks, one of which is shown as track 118. The tracks are grouped radially into a number of zones, three of such zones are shown as zones 151, 152 and 153. The number of tracks in each zone is generally different from the number of tracks in the other zones. The tracks on the disk surfaces in a disk stack (not shown) which lie at equal radii are identified by a cylinder number. Thus, a cylinder address identifying the location of a particular radius on disk 104 also identifies a track, such as track 118 on the disk.

Disk 104 further comprises a plurality of servo sectors 120 which extend across the tracks in a generally radial direction. Within each zone, the tracks are also circumferentially divided into a number of data sectors 154. Note that the number of data sectors per track varies from zone to zone. In the preferred embodiment, the servo sectors 120 are labelled as either an even number servo sector or an odd number servo sector.

Figure 2:
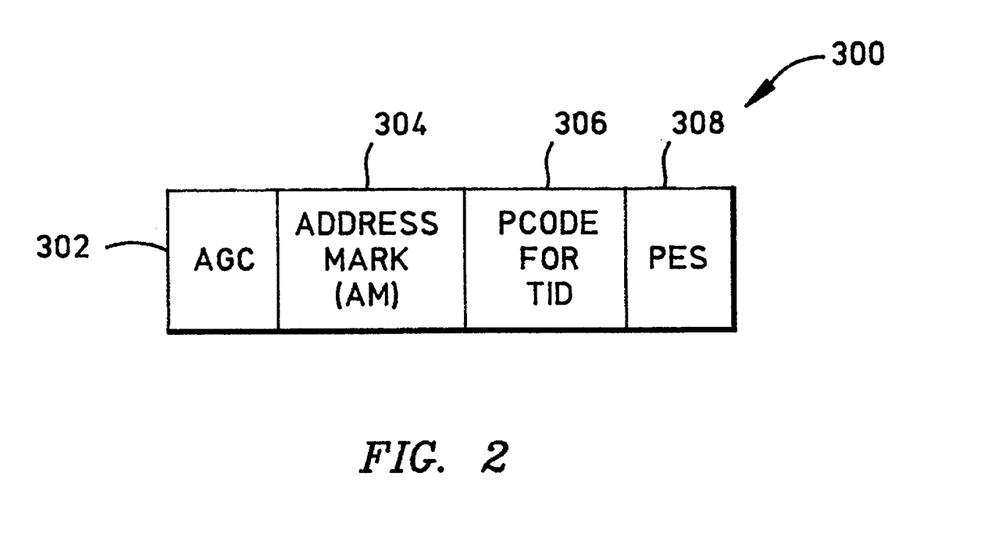
FIG. 2 is a representation of servo information field data structures recorded on the disk illustrated in FIG. 1.

FIG. 2 is a representation of the information contained in a servo information field 300 in one of the sectors 120 of the disk 102 illustrated in FIG. 1. An initial section of the servo information field contains an automatic gain control (AGC) block 302 that contains synchronizing information for the timing module 220. The next section of the servo information field comprises an address mark (AM) field 304 that is used for timing purposes, and is also checked by the logic of the present invention for validity. The next section of the servo information field is a track identification number (TID) field 306 that contains Pennington code that is analyzed according to the processing steps of this invention, described in detail below with reference to FIGS. 7–11. The final section of the servo information field comprises a position error signal (PES) field 308 that contains the information from which the PES value is derived.

Head Positioning Overview

Again referring to FIG. 1, the servo information produced by the R/W circuitry includes a track identification number and a PES value, which the servo control processor provides to the servo electronics that causes the head to be moved to a desired disk track, and then remain centered over the track.

The PES is sent along data path 166 from the R/W circuitry to position error signal module 270. The module converts the PES from analog signal to a digital signal, also referred to as the PES burst. In accordance with this invention, the track identification or cylinder address number is recorded on the disk 102 according to a Pennington code (PCODE) encodement scheme well-known in the art. The PCODE is stored as a transition signal, discussed in detail with reference to FIG. 5 below. The transition signal is converted into binary values by the module 212. The actuator position control module 218 receives control information from processor 116 through path 266. The processor determines the number of the track over which the head 108 is located, and the location of the head within the track, through the servo information received from the R/W circuitry. The R/W circuitry passes the information to a detect module 212. This servo information is passed to the processor from the detect module. The detect and convert module stores the address mark, and the PCODE containing the track number or cylinder address. The address mark is also converted into digital data by module 212.

The address marker and PCODE data field are passed along path 282 to a bank of storage registers 280. The information in the storage registers can then be retrieved by the arithmetic logic unit 130 (ALU) within servo control processor 116. The PES burst in module 270 is also retrieved by the ALU along path 284. In accordance with the best mode for carrying out the present invention a logic module 135, referred to as a redundant Pennington code checking module (RPCCM) is used with the PCODE information to determine if the encoded address is valid, and then to send a control signal based on the determination. In a preferred embodiment, the RPCCM module is equipped with logic in the form of microcode embedded in a read only memory (ROM) chip 134. It should be apparent to those skilled in the art that the logic could be implemented strictly in hardware or entirely as software embodied on a well-known recording medium. Random access memory (RAM) 132 is used by the RPCCM module in conjunction with the ALU for carrying out the method of the present invention, including changing the states of status bytes 133 to indicate errors detected in the PCODE.

Those skilled in the art will recognize that other electronic components shown in the disk drive 102 are necessary for carrying out the function of the disk drive. These well-known components are described herein for the sake of completeness. Interface electronics 119 is part of drive 102. The interface communicates with a host computer (not shown) along path 162. The interface electronics is also in communication over path 164 with formatter electronics 115 which is used to send write signals through path 168 to the R/W circuitry to format a disk, such as disk 104. The interface is also in communication along path 170 with RAM 117 and the servo control processor for carrying out host-implemented instructions.

Servo electronics 212 further comprises timing generation logic 220 for generating timing signals necessary for operation of the electronics in a manner well-known in the requisite art and also provides timing signals necessary for detecting transition signals, servo sector counter 214 for providing current servo sector number at its output, and safety logic 216 for performing various safety tests to ensure the proper operation of the servo electronics. The actuator position control 218 compares, among other things, cylinder values received from the servo control processor and cylinder information received from safety logic 216. Data buses 236, 233 and 230 are used within the servo electronics for the communication of the above-mentioned modules. Additionally, data buses 238 and 236 allow the formatter electronics to communicate with the servo electronics. The actuator position control module 218 receives its instructions from the control processor along data path 266. The timing module 220 is also in direct communication with the R/W electronics 113. In accordance with the present invention, the actuator position control module receives its signals for controlling the actuator arm directly from the servo control processor 116 which acts according to the process steps of this invention implemented by the RPCCM module 135. The actuator position control module 218 functions in a manner known in the requisite art by providing the appropriate signal to the voice coil module 190 in order to effectuate the movement of head 108 mounted on arm 106 toward the target track.

Preferred Embodiment for Enabling Redundant PCODE Checking

As head 108 passes over the track toward the desired track in the target cylinder, R/W electronics 113 receives signals from head 108 and passes those signals to servo electronics 112. The signals comprise, among other things, cylinder addresses stored on even and odd number servo sectors on each track that passes under head 108. The R/W electronics in turn communicates the cylinder address, PES and AM to detector module 212 which decodes the track ID information, including the cylinder address written in PCODE. The servo processor, according to the present invention, uses logic described below in a preferred embodiment of pseudocode that checks the full PCODE transition signal for errors to determine if the PCODE is reliable enough for the address contained therein to be used to position the head. The preferred embodiment of the pseudocode is shown in the following table.

Pseudo-code TABLE

```
PCODE 1 = REG.1
PCODE 2 = REG.2
if|PCODE 1 - PCODE 2| ≤ 1 goto GOOD
if (PCODE 1 or PCODE 2) = ESTIMATION goto CHECK
    set PCODE_ERROR flag
CHECK:
    set PCODE_MISMATCH flag
GOOD:
    continue
```

The pseudocode fetches the contents of REG.1. REG.1 contains a variable representing a first half of the Pennington code (binary values) and places it in a memory location PCODE1. The code further fetches the contents of REG.2, which is a variable representing a second half of the Pennington code and places it in memory location PCODE2. Then a comparison step compares the binary values of each variable. If the value of the remainder of PCODE1–PCODE2 is no greater than the binary value of 1, then the address in the original PCODE is considered reliable. That is, if the absolute value of the remainder is "0000" or "0001" then the address is considered reliable. In the pseudocode, this is represented by a "goto" or transition to a step labelled "GOOD". This causes all of the other steps in the code to be skipped. However, if the test is not met, then the variables are compared to a calculated head position estimation represented by the variable "ESTIMATION". If either PCODE1 or PCODE2 matches ESTIMATION, then a "goto CHECK" step causes a flag to be set indicating that PCODE1 and PCODE2 did not meet the comparison criteria. This error flag is the "PCODE_MISMATCH" flag. However, if neither PCODE1 or PCODE2 matches the estimation then another flag is set to indicate this condition. This flag is the PCODE_ERROR flag. If both flags are set, then the PCODE address is considered invalid.

This above-described pseudocode is a simplified overview of an embodiment of code for carrying out the processing steps of FIGS. 7–11. For the sake of simplicity, not every step from the flow diagram is described in this pseudocode. However, those skilled in the art will be able to practice the invention by combining the teachings of the flow diagrams with the pseudocode embodiment described herein.

Pennington Code Parsing

Figure 4:
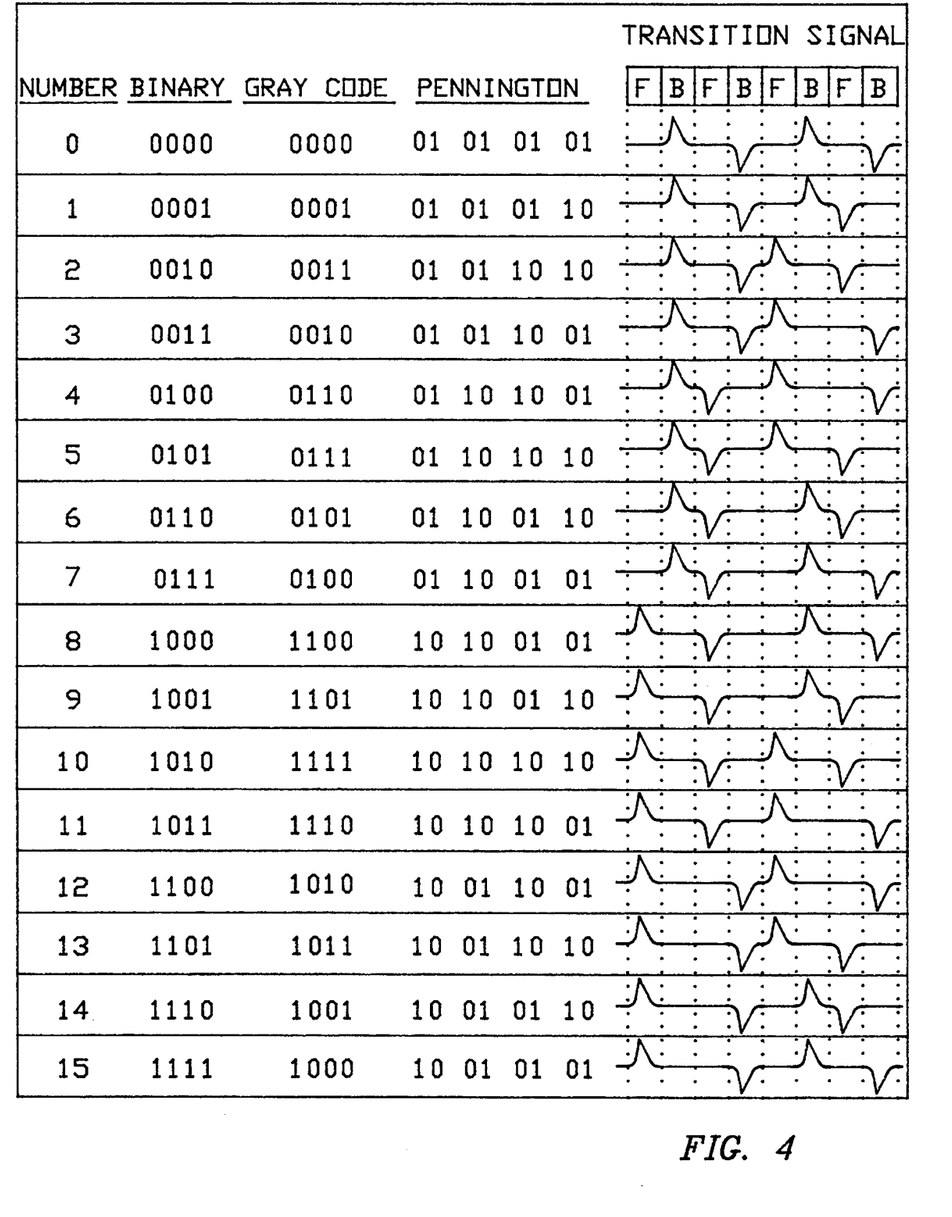
FIG. 4 is a table of track identification numbers and corresponding encoded values and observed signals as read from the disk 104 and decoded by the servo control processor 116 illustrated in FIG. 1.

FIG. 4 is a table that illustrates the track identification number encodement scheme, used with a Pennington code encoding system that is checked for errors in accordance with this invention. The FIG. 4 table includes columns labeled number, binary, gray code, Pennington, and transition signal. The "number" column corresponds to the track identification number encoded in the servo information fields of the disk illustrated in FIG. 1. The "binary" column contains the binary numerical equivalent of the track identification number and the "gray code" column contains a conventional gray code equivalent of the binary number. The "Pennington" column contains the Pennington code or PCODE which entails a binary track number as encoded onto the disk 102 in accordance with the principles of the present invention. The "transition signal" column is a representation of the electrical signal produced by the head of the disk drive when it reads the encoded track identification number.

This invention takes advantage of the PCODE that is used to record transitions from one track to the next. The recordation scheme is well-known in the art; however, the table will be used to explain its implementation for a better understanding of this invention. Referring to FIG. 4, an example entry is explained below. For track number 2, the binary representation of that track is given by "0010". The gray code value for track number 2 is then "0011". In a Pennington scheme "01" is substituted for a "0" and "10" is substituted for a "1". Therefore, the PCODE for track number 2 is "01011010". It is well-known in the prior art to decode this PCODE to determine the cylinder address. However, the prior art only uses one-half of the PCODE to produce a gray coded cylinder address. For example, for track number 2 the gray code value is "0011". In the transition signal for track number 2, the gray code value corresponds to that which is referred to as the "front half" of the PCODE. Referring to the transition signal for track number 2 illustrated in FIG. 4, the front half is designated by the letter "F" in the top column and refers to each bit that is part of the front half. Similarly, each bit in the back half is designated by the letter "B" in FIG. 4. Thus, the most significant bit in this front half of the transition signal for track number 2 is a zero, and this corresponds to a flat portion of the transition signal. The next most significant bit is also a "0" and it corresponds to a flat portion of the transition signal. The next most significant bit in the front half is a "1", corresponding to an upward spike in the signal. The least significant bit, in the front half, is also a "1" and is shown as a downward spike in the transition signal.

It should be apparent to those skilled in the art that the front half of the PCODE corresponds directly with the gray code value for the cylinder address. Thus, the prior art technique of extracting only the front half of the PCODE to reach a de-modulated gray code value typically was adequate for determining the cylinder address as long as there was no erroneous data in the PCODE. However, as has been described above, if there is an error in the PCODE, a significant amount of error recovery will be needed to position the head in the proper position. Thus, based on a critical recognition by the inventors of this invention that both the front half and the back half of the PCODE can be used to ensure reliability, a method and system has been created for decoding both halves of the PCODE.

Figure 5:
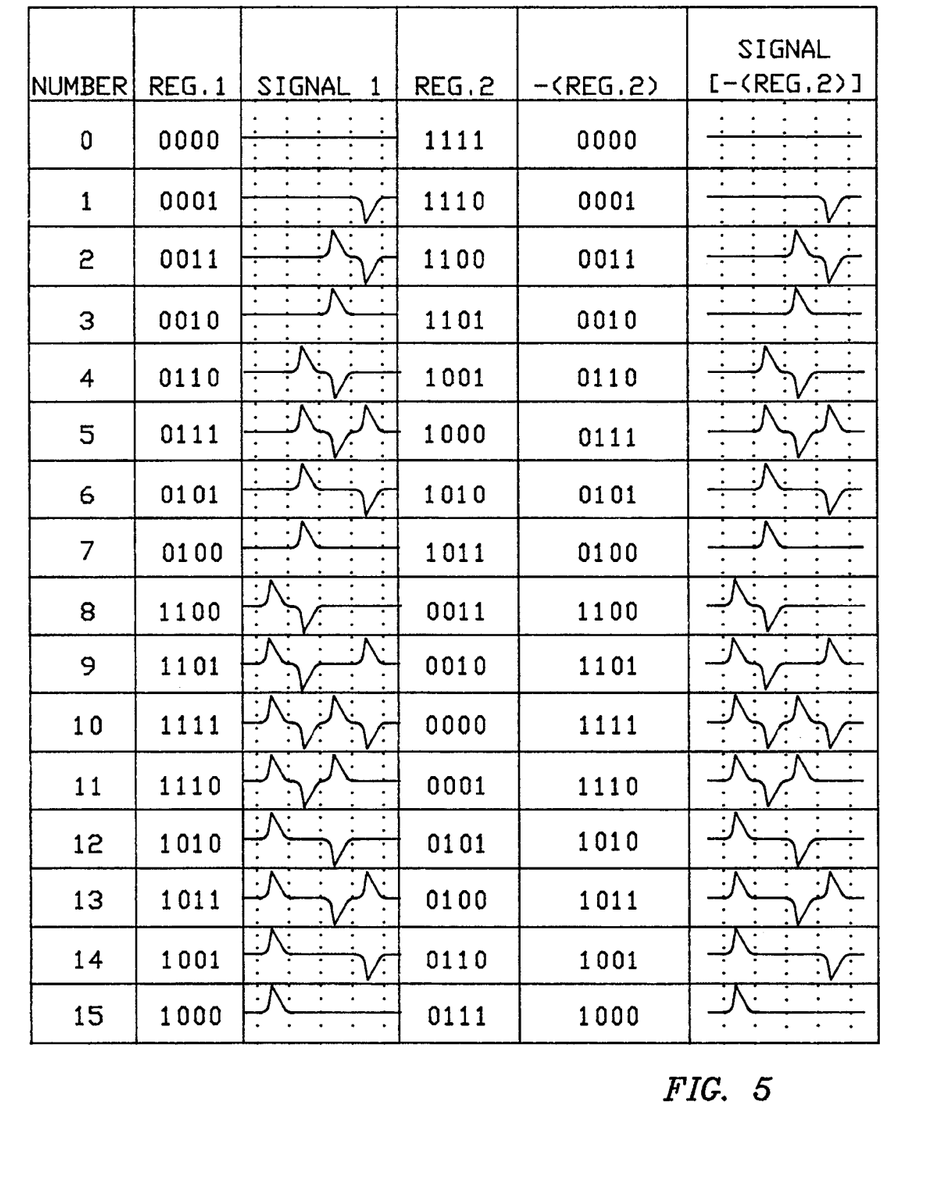
FIG. 5 is a table of the track identification numbers shown in FIG. 3, divided and placed in the registers of FIG. 3 for comparison according to the method of the present invention.

Returning to the example for track number 2 in FIG. 5, a method for ensuring reliability of PCODE entails decoding the back half of the transition signal as well as the front half, and placing each in memory to be compared for their respective contents. The back half of track number 2 in the Pennington code is "1100". The transition signal for the back half is then represented by an upward peak for the most significant bit, a downward peak for the next most significant bit, a flat portion for the next most significant bit, and another flat portion for the least significant bit. The servo microcode module 135 compares the two separate decoded transition signals to determine the validity of the gray code information, and thus the reliability of the cylinder address. The back half of the Pennington code transition signal is inverted and then compared to the front half of the Pennington code transition signal and if these two entities match, the decodes are considered valid.

The inventors have recognized that in the case where the head is over a track boundary, the two halves of the gray code will probably not match. This is because the strength of the signals that are sensed by the head from either track would be approximately equal to each other. In such a case, some data might be read from one track and some from the other. The resulting PCODE transition signal decoded by module 212 would not be accurate for either track. To recover from such an erroneous condition, the servo microcode module 135 can utilize the information from the "PES burst" and a head position estimator to position the head. The head position estimator is a value well-known in the art and reference may be made to U.S. Pat. No. 4,914,644 by James C. Chen et al., assigned to the assignee of this invention, for a detailed explanation of a computation of a head position estimation value in a servo disk system. This patent is incorporated, in its entirety, herein by this reference.

Figure 3:
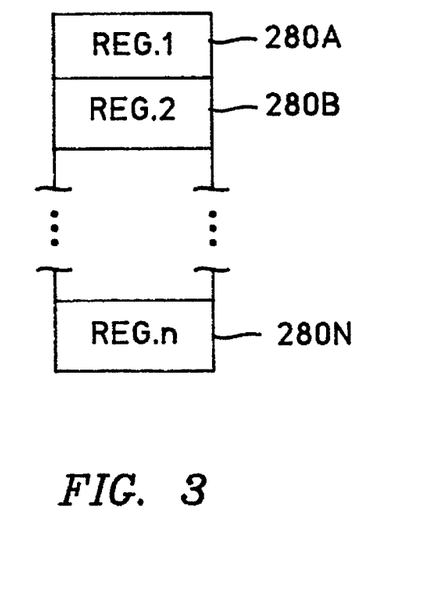
FIG. 3 is a diagram showing some registers of the register bank shown in FIG. 1 useful for enabling the method of the present invention.

Referring to FIG. 3, the bank of registers 280 illustrated in FIG. 1 is shown in more detail. REG.1 denotes a first register 280A that is used in the present invention to store values from the transition signal illustrated in FIG. 4. REG.2 corresponds to a second register 280B that is used, in a preferred embodiment, to store a portion of the transition signal illustrated for the Pennington code in FIG. 4. Finally, a REG.N is shown to correspond to an nth number 280N. Preferably, this invention is enabled by using these registers; however, it should be apparent to anyone skilled in the art that any memory technique for storing the Pennington code values will also work.

Referring to FIG. 5, the demodulation of the Pennington code into a front and back half in accordance with the present invention is illustrated. For example, in track number 2 the front half of the complete transition signal (illustrated in FIG. 4) is broken into a half signal as shown in the column denoted as Signal 1. In a preferred embodiment, the transition signal is converted to a binary representation of the PCODE before being broken up, and a comparison is performed using the binary values. However, the transition signals can be broken without converting it and a comparison of the two halves could be performed using the signal.

Figure 6:
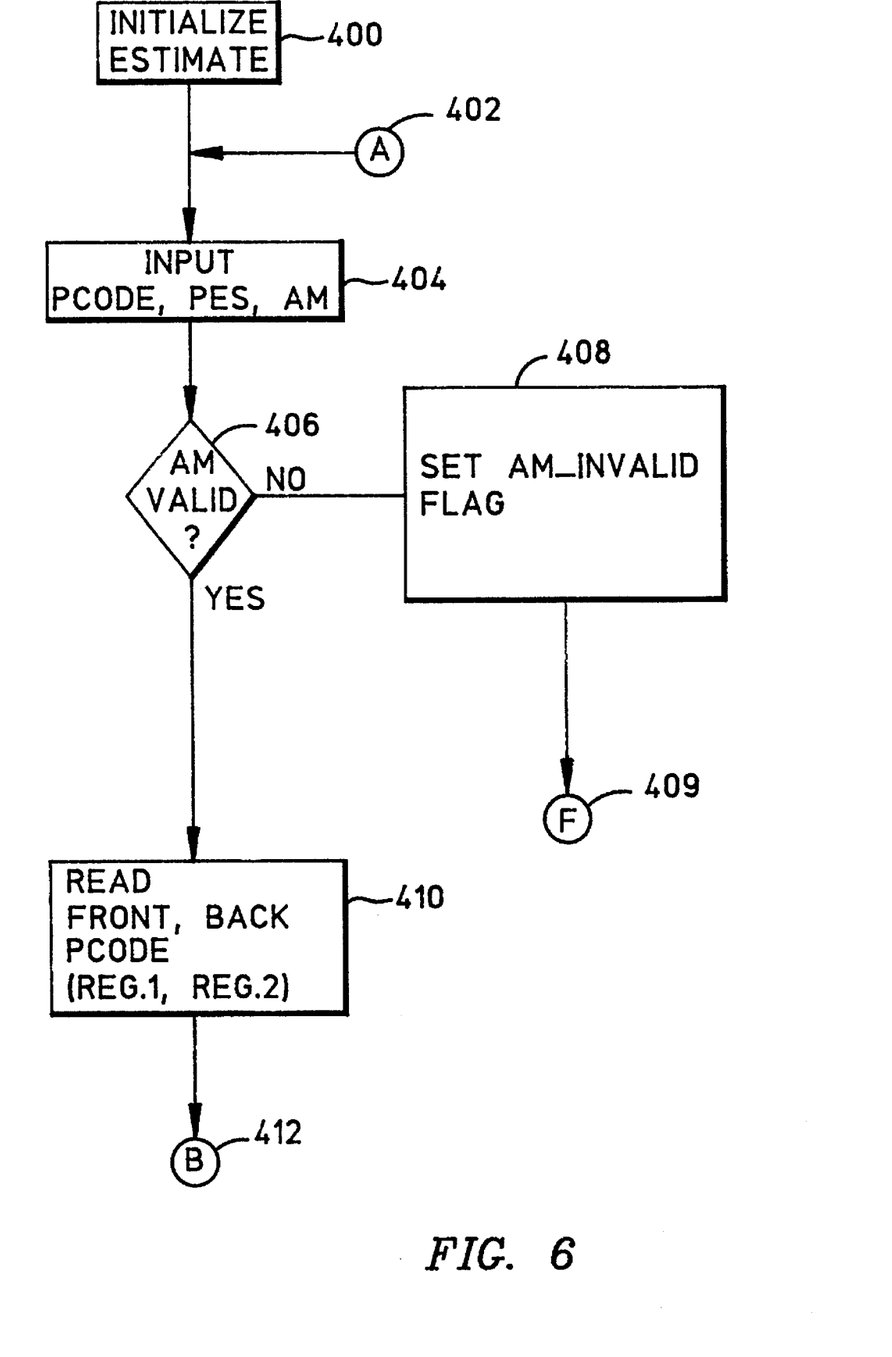
FIGS. 6, 7, 8, 9 and 10 are flow diagrams, each flow diagram illustrating the processing steps followed by the system illustrated in FIG. 1.

The binary value corresponding to this SIGNAL 1 is stored in storage register REG.1. Thus, it can be seen that the value stored in REG. 1 for track number 2 is "0011", which corresponds to the gray code cylinder address. The signal for REG.2, not shown in FIG. 6, is stored in binary value as "1100". In accordance with this invention, this value is inverted, as shown in the column denoted as "–(REG.2)" and corresponds to the value "0011". The signal for –(REG.2) is shown in the column designated as "SIGNAL". In a non-error condition (i.e., the PCODE is reliable), SIGNAL 1 is identical to SIGNAL. Thus, the inventors have recognized that the signals derived from REG. 1 and REG.2 can be compared according to the processing steps of this invention to determine if the cylinder address is correct. For the purposes of better specifying this invention, the values for REG. 1, signal 1, REG.2, –(REG.2), and signal corresponding to track numbers from 0 to 15 are shown in FIG. 5.

In a situation where the gray coded cylinder address determined from the PCODE is determined to be unreliable, the present invention utilizes the PES burst and the head position estimation value to determine what track to place the head over. For this reason, the head position estimation is briefly described below.

Head Position Estimation

The head position estimator operates according to the principles described in the incorporated U.S. Pat. No. 4,914,644. It is briefly described, for the sake of completeness. Reference should be made to the incorporated patent for the most specific detail.

Generally, the servo estimator value is derived in the following fashion. The servo processor first initializes the state of the VCM by setting the estimated head position, velocity and acceleration, $X_E$, $V_E$ and $A_E$, to respective values of $X_{MAX}$, 0 and 0. For purposes of this explanation, this is assumed to be the first computation of a control signal U, so a counter n is set equal to zero. The servo control processor then inputs the digital values of the PES burst, which is required to compute the actual head position, $X_T$. An error term, E, is next computed as the difference between $X_A$ and the predicted head position, $X_T$ from a previous prediction update. The estimated head position, $X_E$, and velocity, $V_E$, are computed based upon the error term, E, in a predicted head position and velocity, $X_P$ and $V_P$. In addition, a "windage" estimate, $W_E$ is made as an estimate of an actuator current required to compensate for certain low frequency or steady state bias forces acting on the $V_M$.

The sensed actuator current i is then input by the servo control processor and used to compute the estimated head acceleration, $A_E$. The velocity error signal, $V_{ES}$, is then computed based upon the difference between the commanded velocity, $V_C$, and the estimated head velocity, $V_E$. The control signal given to the actuator control position module is then computed and outputted to the VCM module. This control signal is a function of the prior control signal, the velocity error signal, $V_{ES}$, and the estimated head acceleration, the latter of which is a function of the measure of $V_M$ current. Following the output of the control signal, the prediction of the state variables, $X_P$, $V_P$ and $W_P$ is updated. These predicted terms are functions of prior control signals, the prior measured VCM current, the prior estimated head position, head velocity and windage and estimator constants defining physical parameters of the disk drive. The counter is updated and the predicted terms are then used in the next computation of the stated variables to determine a head position estimation. The estimated head position is completed according to the principles of this invention to correct for errors found in the Pennington code.

Processing Steps

Referring to FIGS. 6–10, the processing steps of this invention are described in detail. With reference to FIG. 6, in step 400, the head position estimation value described above is initialized. Step 402, denoted with letter "A", is a continuation step which will best be understood with reference to the explanation below. In step 404, the values for PCODE, PES, and the address marker (AM) are input from the head 102 to the R/W electronics 113, and then to the detect module 212. In step 406 the address marker is checked to determine if it is valid. Whether the AM marker is valid depends on well-known criteria for such address markers in servo architecture. If it is not, then in step 408 an error flag, AM_INVALID, is set. In the case, the PCODE information is not used. Rather, as described with reference to step 432 of FIG. 9, the head position estimation is used to position the head. If the AM is valid, then processing continues to step 410. In step 410 the front and the back of the PCODE are read and placed in REG.1 and REG.2, respectively. Processing continues through continuation step 412 shown with the connecting letter "B" and then on to step 414 of FIG. 7.

Figure 7:
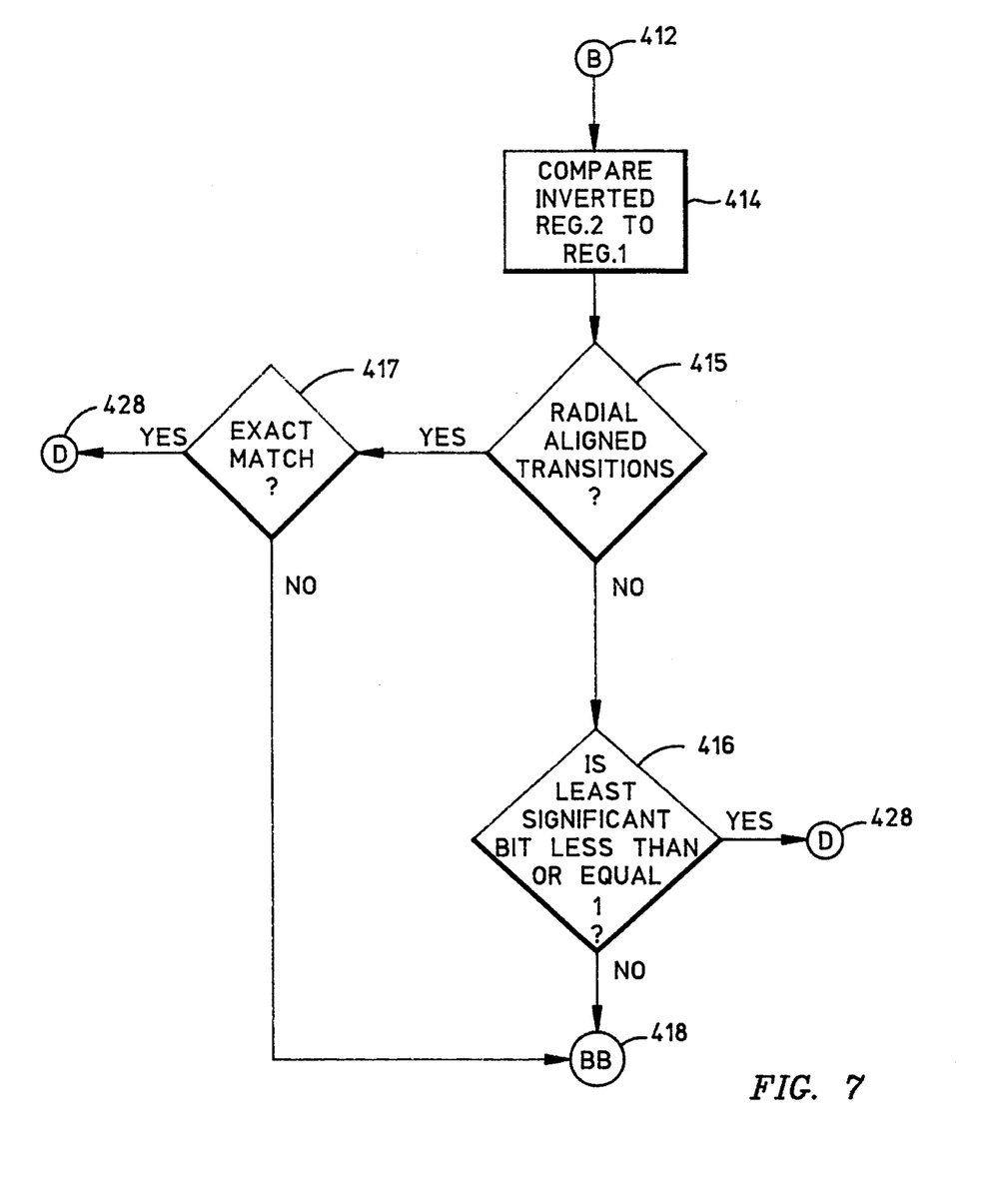
Figure 11:
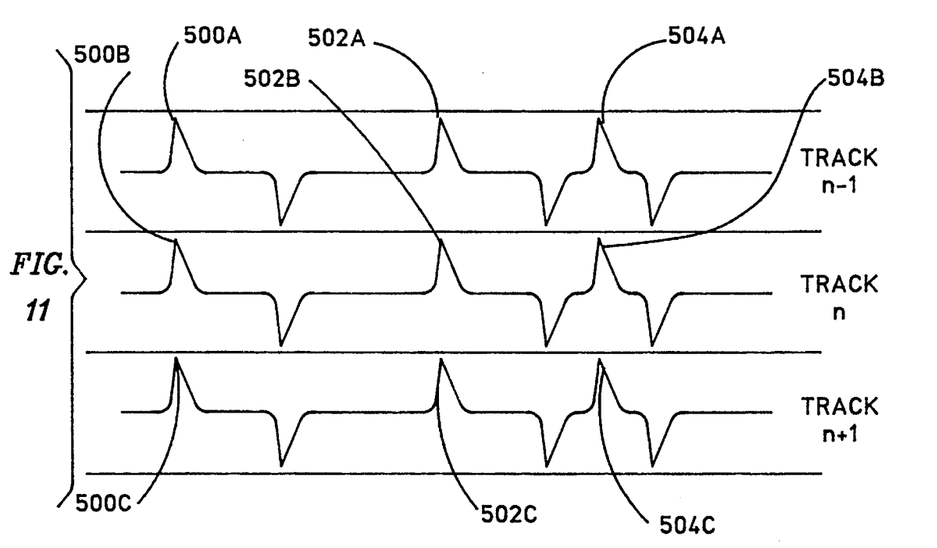
FIG. 11 shows a radially-aligned transition signal pattern, where all of the transition signals from one track to the next on disk 102 are aligned from cylinder to cylinder, such a pattern being recognized and handled accordingly by the system and apparatus of FIG. 1 when carrying out the processing steps shown in flow diagrams 6–10.
Figure 12:
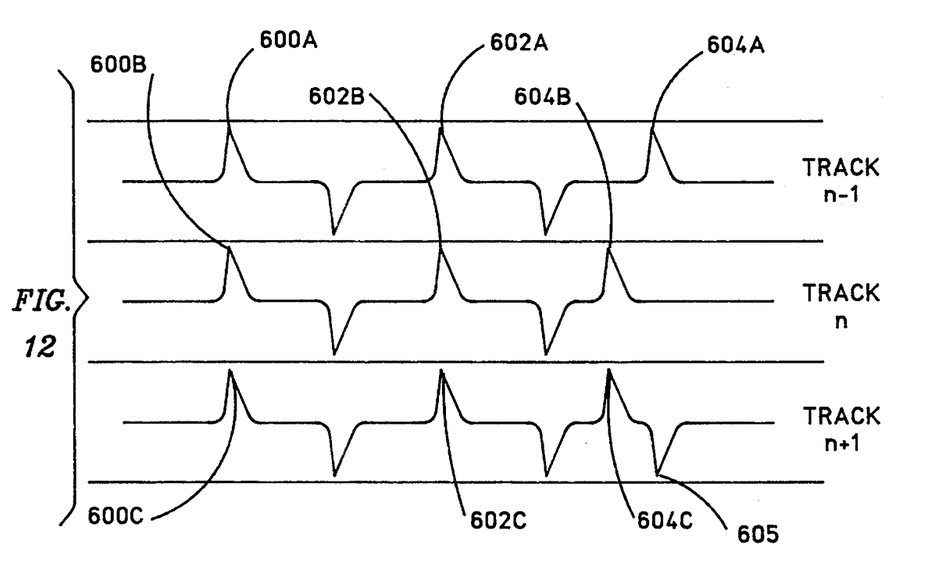
FIG. 12 shows a non-radially-aligned transition signal pattern, where all of the transition signals from one track to the next on disk 102 are not aligned from cylinder to cylinder, such a pattern being recognized and handled accordingly by the system and apparatus of FIG. 1 when carrying out the processing steps shown in flow diagrams 6–10.

Referring to FIGS. 7, 11 and 12, the comparison steps are explained according to this invention. In step 414 the inverted value of REG.2 is compared to the value in REG.1. For example, with reference to the example referred to above, for track number 2, the value in REG.1 is "0011", and the value in REG.2 is "1100". When REG. 2 is inverted, the value becomes "0011". An inquiry is posed and checked by the code module 135 to determine if the tracks on the disk are non-radially aligned, as shown in FIG. 12, or radially aligned as shown in FIG. 11. Both alignment configurations are discussed in more detail below with reference to the respective Figures. In step 415, if the tracks are radially aligned, then a comparison, in step 417, determines if there is an exact match of the register contents. If the answer is "yes", the processing continues to step 428 denoted with the letter "D". If the answer is "no", processing continues to step 418. If the tracks are not radially aligned, processing goes from step 415 to step 416, and a comparison of register contents, where REG.2 is subtracted from REG. 1, must yield a value wherein each bit subtracted from the same order bit yields zero, except that the least significant bit of the two registers may be off by one. Thus, in step 416, if the least significant bit is less than or equal to 1, while each of the more significant bits is zero, then processing continues to step 428 denoted with the letter "D." Such a situation represents a reliable address within the PCODE, and this will be discussed in detail below. In the example given, the comparison of REG.1 and REG.2 would satisfy either test. Referring again to FIG. 7, if the answer to the inquiry in step 416 is "no" then processing continues to continuation step 418 denoted with the letters "BB".

Figure 8:
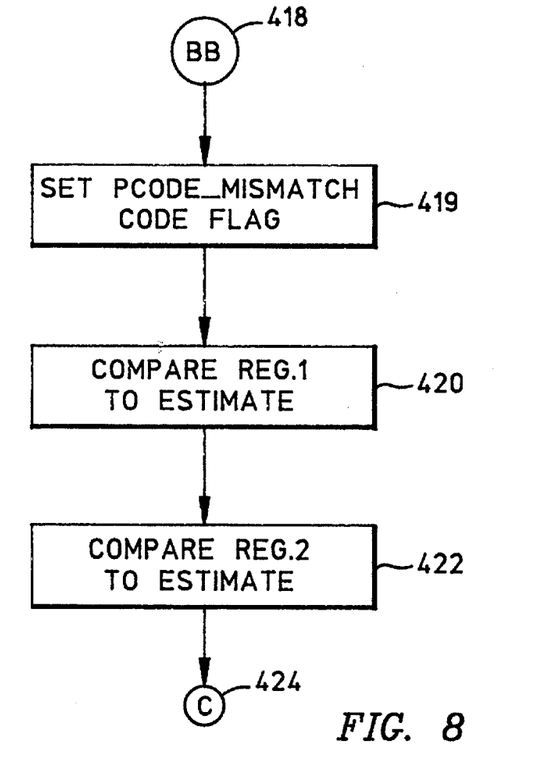

Now referring to FIG. 8, in step 419, an error flag is set in the RAM status bytes 133. In this case, a flag denoted as "PCODE_MISMATCH" is set to indicate that a mismatch has occurred between the front half of the Pennington code and the back half of the Pennington code. In step 420, the value of REG. 1, which corresponds to gray code value is compared to the head position estimation. In step 422, the back half of the contents stored in REG.2 are compared to the head position estimation. Processing then continues to continuation step 424 denoted with the letter "C".

Figure 9:
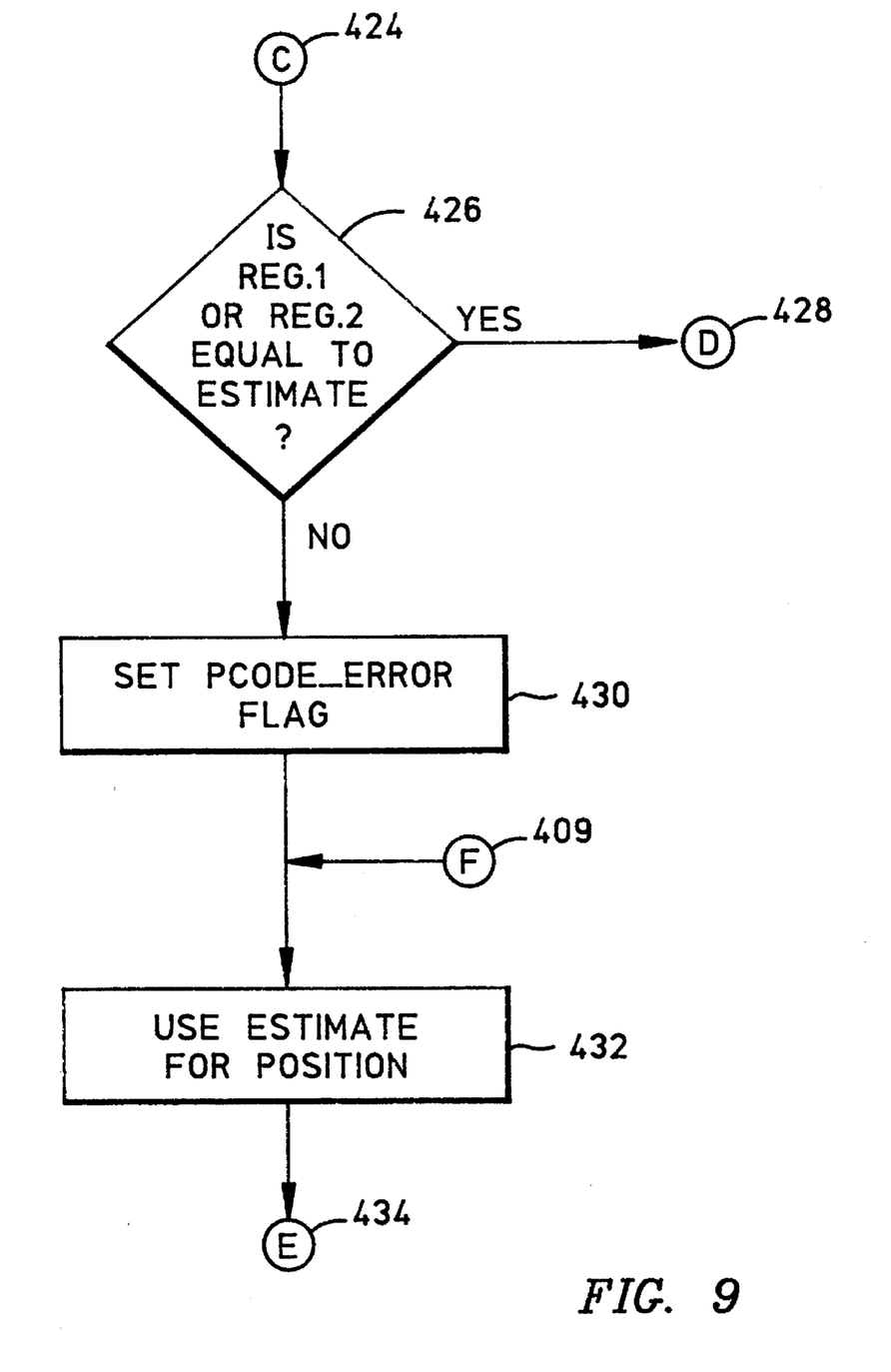

In FIG. 9, the processing steps continuing from the above FIGS. 6–8 are shown. In step 426, an inquiry is posed by the code module 135 and based on the comparison steps 420 and 422 to determine if either REG.1 or REG.2 is equal to the head position estimation. If the answer is "yes" then processing continues to step 428, to handle the non-error or "usable PCODE" condition. However, if the answer is "no", then processing continues to step 430. In step 430, the RAM indicator status bytes 133 are further set to indicate an error denoted as the "PCODE ERROR". Once both the PCODE_ERROR flag and the PCODE_MISMATCH flag have been set, this indicates that the PCODE is invalid and the head position estimation should be used in accordance with step 432 for determining the head position, and processing continues to step 434 denoted with the letter "E". Note that step 409, denoted with the letter "F", is carried out when the AM_INVALID flag is set. In such a case, all of steps 410–430 would be skipped and processing would continue from step 409 to step 432 and then to step 434.

Figure 10:
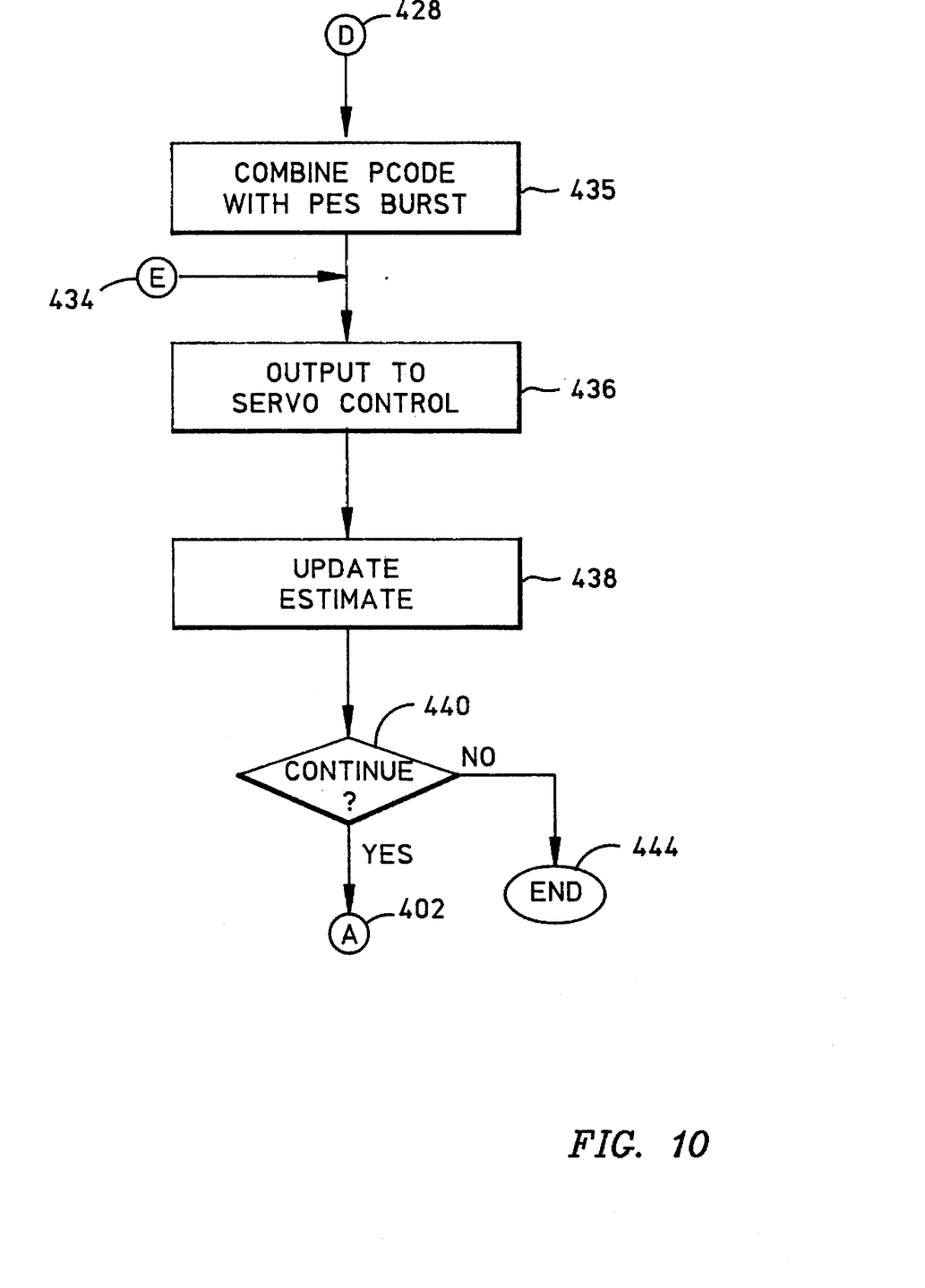

Referring to FIG. 10 and with reference to the above processing steps described with reference to FIGS. 6–9 above, the completion of the processing steps is explained. Step 434 directly flows into step 436 and bypasses step 435. Thus, processing step of 435 which combines the PCODE with the PES burst is only carried out to determine head position when either one of two conditions are met. One of these conditions, described above with reference to FIG. 8, occurs when the answer to the inquiry in step 416 is "yes", indicating that the least significant bit is less than or equal to 1 when inverted REG.2 is compared to REG. 1. The other condition occurs when even though the answer to the inquiry to 416 is "no", the contents of either REG.1 or REG.2 match to the head position estimation, indicating that the value of the PCODE can be used. In the case of either of those two above-described conditions having been met, then step 435 is carried out and passes directly to step 436. If either of the conditions are not met, then step 434 which flows directly into step 436. In this case, the head position estimation is used to locate the head at the head at the correct track. In either case, step 436 involves the servo control processor sending an output control signal from the module 135 to the actuator position control 218, and then to the VCM module 190. In step 438, the servo estimate is updated according to this last recorded movement of the head to the correct track. The above-described steps can be repeated as often as necessary according to the programming of the disk drive. Thus, in step 440 a continuation inquiry is provided, and if the answer is "yes" then processing continues to connecting step 402 which continues in FIG. 6 and represents the repetition of all the steps described above. Once the entire processing is complete, then processing ends as shown in step 444.

Referring to FIG. 11, a series of transition signals for tracks that are radially aligned are shown. Track N-1 is shown with transition peaks of interest 500A, 502A and 504A. Notice that the next track N is a radially aligned, and thus transitions peaks match those in track N-1, peaks i.e., 500B, 502B and 504B. The transition peaks in track N+1 are radially aligned with those of track N. Thus, peak 500C, 502C and 504C align precisely with transition peaks 500B, 502B and 504B. As described above, with reference to FIG. 7, when tracks are radially aligned, then the values of REG.1 and REG.2 must match in order for the PCODE to be considered correct.

FIG. 12 shows an example of non-radially aligned transition signals. Track N is not radially aligned with track N-1. Notice that peaks 600A and 600B match exactly, and so do peaks 602B and 602A. But, transition peaks 604B and 604A do not match. When the above-described comparison shows FIG. 7 is carried out, the value of REG.1 and REG.2 must be within one least significant bit of each other. Referring to track N+1, it can be seen that peak 600C is aligned with peak 600B from track N and is peak 602B is aligned with 602C; however, peak 605 is unmatched by any peak in track N and thus the two tracks are non-radially aligned. Again, the values compared in REG.1 and REG.2 must be within at least one least significant bit in order for the values of the PCODE to be considered valid, as described above with reference to FIG. 7.

Figure 13:
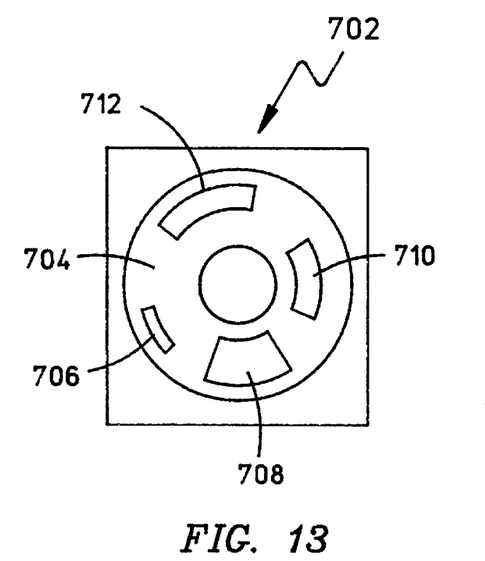
FIG. 13 shows a computer program product embodying the logic shown in FIG. 1 and enabled to process the steps shown in FIGS. 6–10.

While this invention is primarily discussed as a method, it can be understood by a person of ordinary skill in the art that the apparatus discussed above in connection with FIG. 1 may be programmed or otherwise designed to facilitate the practice of the method of this invention. Also, an article of manufacture, such as the prerecorded floppy disk 702 in FIG. 13 or other similar computer program product, for use with a data processing system, could include a storage medium, such as magnetic storage medium 704, and program means recorded thereon, such as the program means 706, 708, 710 and 712 in FIG. 13, for directing the data processing system to facilitate the practice of the method of this invention. It will be understood that such apparatus and articles of manufacture also fall within the spirit and scope of this invention.

The present invention has been described above in terms of a preferred embodiment so that an understanding of this invention can be conveyed. However, there are other embodiments for carrying out this invention. For example, the Pennington code may be translated directly back to a direct binary representation of the address as shown in the binary number field in FIG. 4. And comparisons of REG.1 and REG.2 may be made where the values stored in REG.1 and REG.2 are the binary number of the track rather than the PCODE value. The present invention therefore is not limited to the particular embodiment described above, but rather it should be understood that this invention has wide applicability with respect to storage media generally. In particular, this invention has wide applicability in determining error values whenever Pennington code is used, and is not necessarily limited to the application of Pennington code to gray code values. Thus, all modifications, variations, or equivalent arrangements that are within the scope of the following claims should therefore be considered to be within the scope of this invention.

What is claimed is:

1. A method for controlling head position in a servo disk system, the system having a controller for calculating a head position estimation and also for positioning the head, wherein at least one disk medium having generally concentric data tracks thereon rotates relative to the head, the disk medium containing at least one servo information field written on at least one track, the servo information field containing head locating information, wherein the head locating information includes a sector address marker, a position error signal (PES) data field, and a Pennington coded (PCODE) data field identifying a particular track, the method comprising the steps of:

reading a servo information field of a track on a disk medium that the head relatively moves over thereby obtaining a PCODE data field for that track;

dividing the PCODE data field in the servo information field into a first part and a second part;

placing the first part of the PCODE data field in a first storage register REG.1;

placing the second part of the PCODE data field in a second storage register REG.2;

inverting the contents of REG.2;

comparing the contents of REG. 1 with the inverted contents of REG.2;

determining if the contents of REG. 1 are within a predetermined range of bits of the inverted contents of REG.2; and sending a control output signal to the controller to position the head, the control output signal being based on the determining step.

2. The method of claim 1, wherein the PCODE data field contains a cylinder address.

3. The method of claim 2, wherein the control output signal is created by combining the PCODE data field a PES from the servo information field.

4. The method of claim 2, and further comprising the step of:

comparing the contents of REG.1 and the inverted contents of REG.2 to a calculated head position estimation; and if either of the contents of REG.1 or the inverted contents of REG.2 match the head position estimation, and the determining step determines that the contents of REG.1 and the inverted contents of REG.2 are not within the predetermined range, then creating the control output signal by combining the PCODE cylinder address with a PES from the servo information field to create the control output signal.

5. The method of claim 4, and including the following step:

if neither of the contents of REG.1 nor the inverted contents of REG.2 match the head position estimation, and the determining step determines that the contents of REG.1 and the inverted contents of REG.2 are not within the predetermined range, then creating the control output signal by using the head position estimation.

6. The method of claim 1, wherein the predetermined range of bits is less than or equal to one least significant bit if consecutive tracks on the disk medium are not radially aligned.

7. The method of claim 1, wherein the predetermined range of bits is zero if consecutive tracks on the disk medium are radially aligned.

8. The method of claim 1, wherein if the sector address mark read in the servo information field is not valid, then creating the control output signal by using the head position estimation.

9. The method of claim 5, wherein the head position estimation is updated based on the control output signal.

10. The method of claim 8, wherein the head position estimation is updated based on the control output signal.

11. A data storage system comprising:

a magnetic storage medium having a plurality of tracks and at least one servo information field in each track having a sequence of magnetic flux transitions recorded therein in Pennington Code (PCODE) that define a track address, and further having a corresponding position error signal data;

a head assembly that reads the servo information field and produces a readback signal comprising a sequence of signal components corresponding to digits of the PCODE address;

a servo control system that controls the position of the head assembly relative to the tracks of the magnetic storage medium, the servo control system including a servo assembly that is activated to position the head assembly relative to the tracks of the magnetic storage medium, servo PCODE error checking logic that determines if the PCODE address is reliable; and a servo controller that activates the servo assembly in accordance with whether or not the PCODE address is determined to be reliable by the PCODE error checking logic.

12. The system of claim 11, wherein the PCODE address is a cylinder address.

13. The system of claim 11, wherein the PCODE error checking logic determines if the PCODE address is reliable by:

dividing the PCODE address into a first part and a second part;

inverting the second part;

comparing the first part to the inverted second part; and determining if the first part is within a predetermined range of bits of the inverted second part.

14. The system of claim 13, wherein the servo control assembly that activates the servo assembly in accordance with whether or not the PCODE address is determined to be reliable by the PCODE error checking logic creates a control output signal by combining a PCODE address determined to be reliable with a corresponding PES data in the servo information field.

15. A servo controller for controlling the position of a head assembly adjacent the surface of a magnetic storage medium that reads magnetic flux transitions recorded in servo information fields of a plurality of tracks in the magnetic storage medium and produces a readback signal, the magnetic flux transitions being recorded in Pennington Code (PCODE) and defining a track address, the servo controller comprising:

a servo assembly that moves the head assembly relative to the tracks of the magnetic storage medium;

a servo decoder that decodes the readback signal from the head assembly; and

PCODE address error checking logic that receives the decoded readback signal and determines if the PCODE address is valid, and creates a control output signal in accordance with whether or not the PCODE address is valid, wherein the output signal is sent to the servo assembly.

16. The servo controller of claim 15, wherein the PCODE address error checking logic checks the PCODE address by:

dividing the PCODE address into a first part and a second part;

inverting the second part;

comparing the first part to the inverted second part; and determining if the first part is within a predetermined range of bits of the inverted second part.

17. A computer program product, for use with a servo disk system, the system having a controller for calculating a head position estimation and also for positioning the head, wherein at least one disk medium having generally concentric data tracks thereon rotates relative to the head, the disk medium containing at least one servo information field written on at least one track, the servo information field containing head locating information, wherein the head locating information includes a sector address marker, a position error signal (PES), and a Pennington coded (PCODE) data field representing a track address, the computer program product comprising:

a recording medium;

means, recorded on the recording medium, for directing the controller to execute the following steps:

reading a servo information field of a track on a disk medium that the head relatively rotates over;

dividing a PCODE data field in the servo information field into a first part and a second part;

placing the first part of the PCODE data field in a first storage register REG.1;

placing the second part of the PCODE data field in a second storage register REG.2;

inverting the contents of REG.2;

comparing the contents of REG.1 with the inverted contents of REG.2;

determining if the contents of REG. 1 are within a predetermined range of bits of the inverted contents of REG.2; and creating a control output signal to position the head, the control output signal being based on the determining step.

18. The computer program product of claim 17, wherein the PCODE data field contains a cylinder address.

19. The computer program product of claim 17, wherein the predetermined range of bits is zero if consecutive tracks on the disk medium are radially aligned.

20. The computer program product of claim 19, wherein the control output signal is created by combining the PCODE data field with a PES from the servo information field.

21. The computer program product of claim 17, wherein the predetermined range of bits is less than or equal to one least significant bit if consecutive tracks on the disk medium are not radially aligned.

22. The computer program product of claim 17, wherein if the address mark read in the servo information field is not valid, then creating the control output signal by using the head position estimation.

23. The computer program product of claim 18, wherein the means recorded on the recording medium, for directing the controller to execute, are further enabled to direct the controller to execute the following step of:

comparing the contents of REG.1 and the inverted contents of REG.2 to a head position estimation; and if either of the contents of REG.1 or the inverted contents of REG.2 match the head position estimation, and the determining step determines that the contents of REG.1 and the inverted contents of REG.2 are not within the predetermined range, then creating the control output signal by combining the PCODE cylinder address with a PES from the servo information field to create the control output signal.

24. The computer program product of claim 23, wherein the means recorded on the recording medium, for directing the controller to execute, are further enabled to execute the following step:

if neither of the contents of REG.1 nor the inverted contents of REG.2 match the head position estimation, and the determining step determines that the contents of REG.1 and the inverted contents of REG.2 are not within the predetermined range, then creating the control output signal by using the head position estimation.

25. The computer program product of claim 22, wherein the head position estimation is updated based on the control output signal.

26. The computer program product of claim 24, wherein the head position estimation is updated based on the control output signal.

27. A method for controlling a head based on whether a Pennington coded (PCODE) address stored in a data field on a disk medium reliably identifies an address corresponding to a location specified by a command to position a head which moves relative to the disk medium, the method comprising:

reading the PCODE address on the disk medium;

dividing the PCODE address into a first part and a second part;

comparing the first part to the second part;

determining the reliability of the PCODE address based on whether the first part is within a predetermined number of bits of the second part; and positioning the head to the specified location if the address is reliable.

28. The method of claim 27, wherein the second part of the PCODE address is inverted after the dividing step and prior to the comparing step.

29. The method of claim 28, wherein the determining of the reliability of the PCODE address based on the comparison of the first part to the second part includes subtracting the second part from the first part and determining if the resulting binary value is within a predetermined range.

30. The method of claim 28, wherein the predetermined range is zero if consecutive tracks on the disk medium are radially aligned.

31. The method of claim 28, wherein the predetermined range is less than or equal to one least significant bit if consecutive tracks on the disk medium are not radially aligned.

32. The method of claim 27, wherein the PCODE address is a cylinder address.

* * * * *